March 28, 1961 M. J. H. STAAR 2,977,124

PHONOGRAPH APPARATUS

Filed Dec. 22, 1955 8 Sheets-Sheet 1

Inventor.
Marcel Jules Helene Staar.
By Carlson, Pitzner, Hubbard & Wolfe
Attys.

Inventor:
Marcel Jules Helene Staar.
By Carlson, Pitzner, Hubbard & Wolfe
Attys.

March 28, 1961 M. J. H. STAAR 2,977,124
PHONOGRAPH APPARATUS
Filed Dec. 22, 1955 8 Sheets-Sheet 3

Inventor:
Marcel Jules Helene Staar
By Carlson, Pitzner, Hubbard & Wolfe
Attys.

March 28, 1961   M. J. H. STAAR   2,977,124
PHONOGRAPH APPARATUS

Filed Dec. 22, 1955   8 Sheets-Sheet 4

Inventor:
Marcel Jules Helene Staar.
By Carlson, Pitzner, Hubbard & Wolfe
Attys.

March 28, 1961 M. J. H. STAAR 2,977,124
PHONOGRAPH APPARATUS
Filed Dec. 22, 1955 8 Sheets-Sheet 5

Fig. 18.

Inventor,
Marcel Jules Helene Staar.
By Carlson, Pitzer, Hubbard & Wolfe
Attys.

March 28, 1961   M. J. H. STAAR   2,977,124
PHONOGRAPH APPARATUS
Filed Dec. 22, 1955   8 Sheets-Sheet 6

Inventor:
Marcel Jules Helene Staar
By Carlson, Pitzner, Hubbard & Wolfe
Attys.

March 28, 1961 M. J. H. STAAR 2,977,124
PHONOGRAPH APPARATUS
Filed Dec. 22, 1955 8 Sheets-Sheet 8

Inventor:
Marcel Jules Helene Staar.

By Carlson Pitzner, Hubbard & Wolfe
Attys

United States Patent Office 2,977,124
Patented Mar. 28, 1961

2,977,124
PHONOGRAPH APPARATUS
Marcel Jules Helene Staar, 30 Square du Solbosch, Brussels, Ixelles, Belgium
Filed Dec. 22, 1955, Ser. No. 554,690
Claims priority, application Belgium Jan. 4, 1955
15 Claims. (Cl. 274—9)

The present invention relates to phonograph apparatus and more particularly to a multi-speed friction drive for the record turntable.

Multi-speed friction drives of the type with which this invention is concerned, employ an idler wheel interposed between a motor driven stepped pulley and a turntable rim, and include provision for disengaging the friction drive by momentarily shifting the idler wheel out of drive relation with the stepped pulley and the turntable. This is done in order that the idler wheel may be moved vertically without interference from the level of a step of the pulley of one diameter to the level of steps of different diameters and the turntable speed changed. The stepped pulley generally has three steps of different diameters to permit the turntable to be operated at 33 r.p.m., 45 r.p.m., and 78 r.p.m., for playing records recorded at either of these three speeds. In addition to the momentary disengagement of the idler wheel incident to changing turntable speed, the mechanism may be arranged, and it is common to do so, to permit setting and maintaining the idler wheel in a declutched or "zero" position out of drive relation with the stepped pulley and turntable in a fully disengaged position.

The switch connecting the motor to the line is ordinarily operated independently and separately of the change speed apparatus, and thus the idler wheel may be shifted to the permanent declutched or "zero" position while the motor is connected to the line and operating. If this occurs, without the moving turntable to serve as a visual on-off indicator for the motor (the motor having the quiet operation characteristic of phonograph apparatus drive motors), the motor may run for indefinite periods without the knowledge of the operator. If permitted for any substantial length of time this may result in damage to bearings or overheating of the motor.

It is one object of this invention to provide a multi-speed friction drive mechanism for phonographs, having a new mode of construction and operation.

It is another object of this invention to provide a switch in the line to the drive motor which opens automatically effective as an incident to shifting the idler wheel of the friction drive mechanism to the permanent declutched or "zero" position, out of drive relation with the stepped pulley on the motor shaft and the turntable.

It is another object of this invention to provide a switch in the line to the drive motor and actuated by the tone arm, whereupon the switch opens when a record has finished playing to stop the turntable and closes to start the turntable when the tone arm is brought into playing relation over the edge of a record, and which is automatically opened to disconnect the motor from the line upon operation of the change speed mechanism to locate the idler wheel in the declutched or "zero" position.

It is another object to provide for opening the line switch if, when the idler wheel is in the declutched or "zero" position, the line switch is closed by locating the tone arm in playing position over the turntable.

It is a further object of this invention to provide a mechanism for holding the tone arm on its rest and restrained against movement while the idler wheel is in the declutched or "zero" position.

It is another object to provide means for disengaging the friction drive by shifting the idler wheel to a permanent declutched or "zero" position and it is a further object to provide an actuator for such friction drive disengaging means.

Further and additional objects will be apparent from the drawings and specifications in which.

While the invention is susceptible of various modifications and alternative constructions, there is shown in the drawings and will be described herein in detail illustrative embodiments of the invention, but it is to be understood that it was not thereby intended to limit the invention to the specific forms disclosed, and it is intended to embrace all modifications, alternative constructions and equivalents within the spirit and scope of the invention as expressed in the claims.

Referring to Figs. 1 through 9, in the phonograph apparatus there depicted the record turntable 10 is motor driven by means of a friction drive including a stepped drive pulley 11 carried on the motor shaft 12 and an idler wheel 13 establishing driving relation between the stepped drive pulley and the rim 14 of the turntable 10. The turntable 10 and the friction drive mechanism in the present instance are supported above a mounting plate 15 having an aperture 16 for the motor shaft 12, the motor being carried in conventional fashion below the mounting plate.

The mounting plate 15 may be fastened within a framework intended to support the phonograph apparatus including the record turntable, drive mechanism, and tone arm, which then may be connected by means of leads to the amplifier and speaker making up the sound reproducing system of which the record turntable and drive therefor shown in the drawings is a part.

In the illustrative form of the invention shown in Figs. 1 through 9, the stepped driving pulley is provided to enable the turntable to be rotated at different turntable speeds. Thus, the mounting plate 15 also carries a support for the idler wheel 13, the support being movable by means of a manually operated lever 17 to locate the idler wheel 13 with reference to the turntable and the different steps of the driving pulley. In order to provide for horizontal or lateral movement of the idler wheel 13, this wheel is supported by an arm 18 which in turn is pivotally mounted on a pin 20 carried in one end of a connecting link 21 formed from a U-shaped channel member. The other end of connecting link 21 is pierced to receive a vertical pin 22 mounted on the frame 15, in such a manner that oscillatory movement of the link 21 moves the idler wheel laterally into and out of driving relation both with the stepped pulley 11 and the rim 14 of the turntable.

Figure 1:
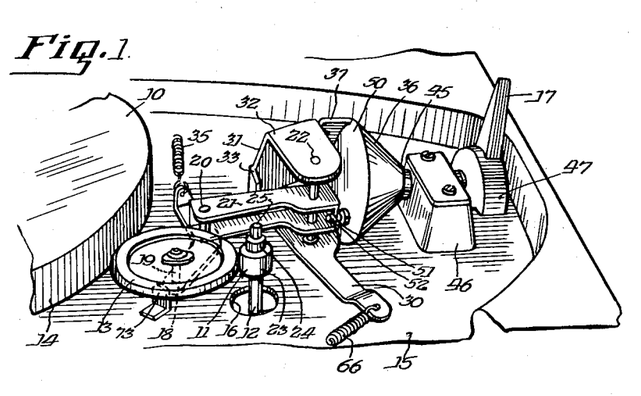
Figure 1 is a perspective view of a multi-speed friction drive constructed according to an illustrative form of this invention.

In the present instance, the stepped pulley 11 is fashioned with three steps of different diameters 23, 24, 25 to enable the turntable 10 to be driven at three different speeds, 33 r.p.m., 45 r.p.m., and 78 r.p.m., to permit playing of records recorded at these three different speeds, although it is intended that steps of different diameters to play records at other playing speeds may be included as well, or substituted in, the friction drive mechanism. In Fig. 1 the idler wheel 13 is illustrated in engagement with the largest step 23 of the stepped pulley and with the rim 14 of the turntable, which produces the highest effective speed ratio and, consequently, a turntable speed of 78 r.p.m. in the construction and arrangement illustrated. To enable the idler wheel to be moved vertically from level to level to engage a different step of the pulley 11, the connecting link 21 is also movable vertically as well as being oscillatable on the pin 22, the mechanism for raising or lowering the idler wheel to be described hereinafter.

Lateral horizontal movement of the arm 18 which with the link 21 supports the idler wheel 13, is, in the present instance, accomplished by manually operable means for momentarily shifting the link 21 about the pin 22. In the illustrative arrangement a horizontal arm 30 which is bent up at one end 31 to form a lug 32 lying parallel with the arm 30 engages to shift the link 21, the arm 30 and the lug 32 being formed with aligned openings for receiving the pin 22 to allow pivotal movement of the arm about this pin. The bent end of the arm 31 carries a finger 33 adapted to engage the link 21 and serves to urge the link 21 and the support 18 for the idler wheel 13 away from the pulley 11 and the rim 14 of the turntable. The rim of the turntable and the pulley 11 are spaced a distance slightly less than the diameter of the idler wheel 13. Thus the spring 35 which normally urges the idler wheel toward the turntable rim and the pulley, wedges the collar wheel therebetween to establish drive relation. The idler wheel 13, however, may be shifted by means of arm 30 out of such drive relation against the action of this spring 35.

Movement of the idler wheel laterally in this form of the invention is accomplished by manually operated means. This means comprises, in the present instance, a control member 36 carrying a cam for moving the arm 30. The cam includes a curved crown 37 on the member 36 provided with teeth 38 (Fig. 2) and coacts with a cam follower carried by the arm 30. The cam follower consists of a stub pin 39 mounted on an angularly disposed bracket 40 which, in turn, is fastened on the bent portion 31 of the arm 30. In this form of the invention, the control member 36 is conical in configuration, although the precise configuration thereof may be varied as desired, and is supported for rotation on a horizontal axis by means of a shaft 45 journaled in a bracket 46 mounted on the plate 15. As shown the shaft 45 terminates in a wheel 47 carrying a lever 17, providing a suitable operating handle.

By manipulating the handle or lever 17 (which normally extends through a shroud concealing the working parts of the apparatus from view) the control member 36 is caused to rotate about its axis, which movement is translated through the cam and cam follower to the idler wheel support to shift the idler wheel 13 into and out of driving relation with the pulley 11 and turntable 10.

In the apparatus shown in Fig. 1 the means for shifting the idler wheel 13 laterally also serves for raising and lowering the idler wheel, and thus the control member 36 is provided on its vertical face 50 with a stud 51 operating to move the link 21 vertically on the pin 22. The end of link 21 adjacent the face 50 of the control member 36 is turned over both on the upper and lower sides of the U-shaped member making up this link, to form a slot 52 (Fig. 1) which receives the stud 51. Upon rotation of the control member 36 a camming action takes place through the interaction of the stud 51 and the end of the link 21, causing the link 21 to be slid vertically on pin 22. Vertical movement of the link 21 is transmitted to the idler wheel 13 through the lever 18 fastened on the free end of the link 21, to cause the idler wheel to be carried from level to level of the steps of the stepped pulley 11 to obtain different speeds for the turntable.

In the form of the invention illustrated in Fig. 1 three driving speeds for the turntable may be obtained, and correspondingly, the crown 37 carried by the control member 36 is provided with three teeth 60, 61, 62 separated by curved indentations 63, 64, forming a continuously curved edge on which the cam follower formed by the pin 39 bears. To insure positive movement of the arm 30 and thus positive lateral movement of the link 21 in response to rotation of the control member 36 the arm 30 is resiliently urged by a spring 66 in a direction to hold the pin 39 against the continuously curved edge of the crown 37. The three teeth 60, 61, 62, in this construction (note Fig. 9) are of gradually increased height so as to provide lateral movement of variable extent of the idler wheel 13 sufficient to clear the idler wheel from the stepped pulley dependent upon whether the idler wheel is being shifted into and out of engagement with a larger or a smaller diameter step of the stepped pulley 11.

Figures 4, 5, 6, 7:
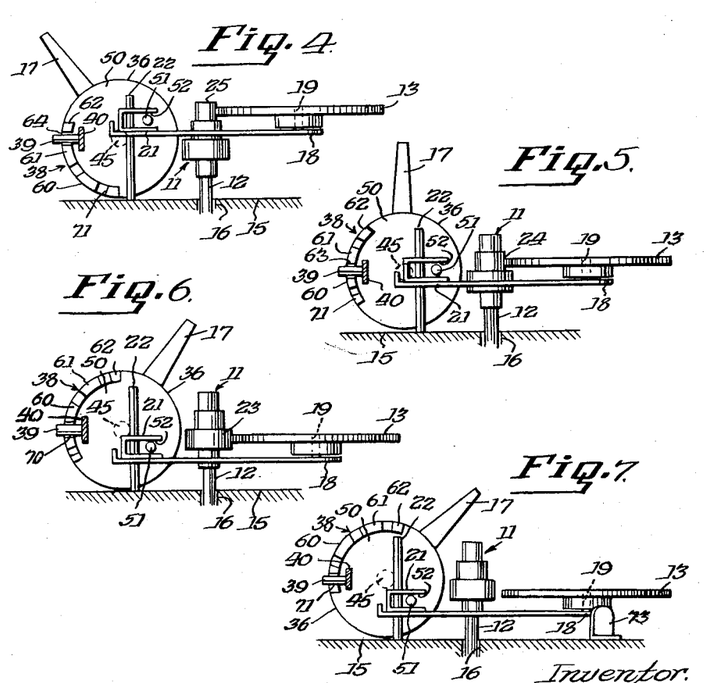
Fig. 4 is a diagrammatic view of a portion of the mechanism shown in Fig. 1 with the idler pulley in drive relation with one of the steps of the pulley carried on the motor shaft.
Fig. 5 is a diagrammatic view of the same portion of the mechanism with the idler wheel positioned in drive relation with another of the steps of the pulley carried on the motor shaft.
Fig. 6 is a diagrammatic view of the same portion of the mechanism shown in Figs. 4 and 5 with the idler wheel engaged with the third step of the pulley carried on the motor shaft.
Fig. 7 is a diagrammatic view of the portion of the mechanism shown in Figs. 4 through 6, with the idler wheel in disengaged position out of drive relation with the stepped pulley on the motor shaft.

In the operation of this change speed mechanism as shown in Fig. 4, the movement of the lever 17 to its extreme counterclockwise position results in locating the idler wheel 13 at the level of and in engagement with the smallest diameter step of the stepped pulley 11, with the pin 39 in the bottom of the indentation 64 between the third and second teeth 62, 61 respectively, formed in the edge of the crown 37 on the control member 36. In the present arrangement, upon rotation of the motor spindle 12, the turntable 14 would be caused to rotate at 33 r.p.m. for playing a record recorded at that playing speed.

Movement of the lever 17 clockwise toward the second position, shown in Fig. 5, causes the pin 39 to slide along the curved edge of the identation 64 toward the top of the second tooth 61, resulting in disposition of the arm 30 about the pin 22 and movement of the link 21 and thus lever 18 in a lateral direction. The idler wheel 13 is thus separated from driving relation with the pulley 11 and turntable 10. At the same time, the pin 51 on the face of the control member 36, which is provided to produce vertical movement of the idler wheel support, travels in a downward direction, resulting in a downward vertical displacement of link 21, and the idler wheel 13 is then placed adjacent the intermediate diameter step 24 of the pulley 11. When the lever 17 is positioned as illustrated in Fig. 5, the pin 39 drops into the indentation 63 separating the first and second teeth 60 and 61 on the control member 36, which permits arm 30 to be biased by spring 66 about pin 22, and allows the link 21 to swivel the idler wheel 13 into driving relation with the intermediate step 24 of the pulley and the turntable 10. With the parts of the apparatus so arranged, the turntable is caused to rotate at 45 r.p.m. for playing records at that speed.

Movement of lever 17 clockwise from the position shown in Fig. 5 toward the position shown in Fig. 6 enables the pin 39 to slide along the sloping edge of the indentation 63 toward the top of the first tooth 60, resulting in pivotal movement of the arm 30 toward link 21 and lateral translation through the lever 18, of the idler wheel 13 away from engagement with the pulley 11 and the turntable 10. The pin 51 on the face of the control member 36, travelling downwardly simultaneously causes link 21 to be lowered vertically until, when the arm 17 is positioned as shown in Fig. 6, the idler wheel 13 is adjacent the lower and largest diameter step 23 of the pulley 11. When the pin 39 arrives at the top of tooth 60 the idler wheel 13 is located at the same level as step 23 but out of engagement with this step of the pulley and also out of engagement with the turntable 10. Further movement of the lever 17 to the position shown in Fig. 6 permits the pin 39 to drop into the indentation 70 adjacent the first tooth 60, the spring 35 fastened to the lever 18, acting to bias the idler wheel into engagement with the largest diameter step 24 of the pulley 11 and the turntable 10, so that the turntable may be driven at 78 r.p.m. for playing records at that speed.

Thus by rotating the lever 17 from the position shown in Fig. 4 through the position shown in Fig. 5 to the position shown in Fig. 6, the idler wheel may be simultaneously shifted laterally into and out of engagement with the pulley and vertically to be brought to the level of the various steps of the pulley, to provide different turntable speeds depending upon the record to be played.

Figures 2, 3, 8, 9:
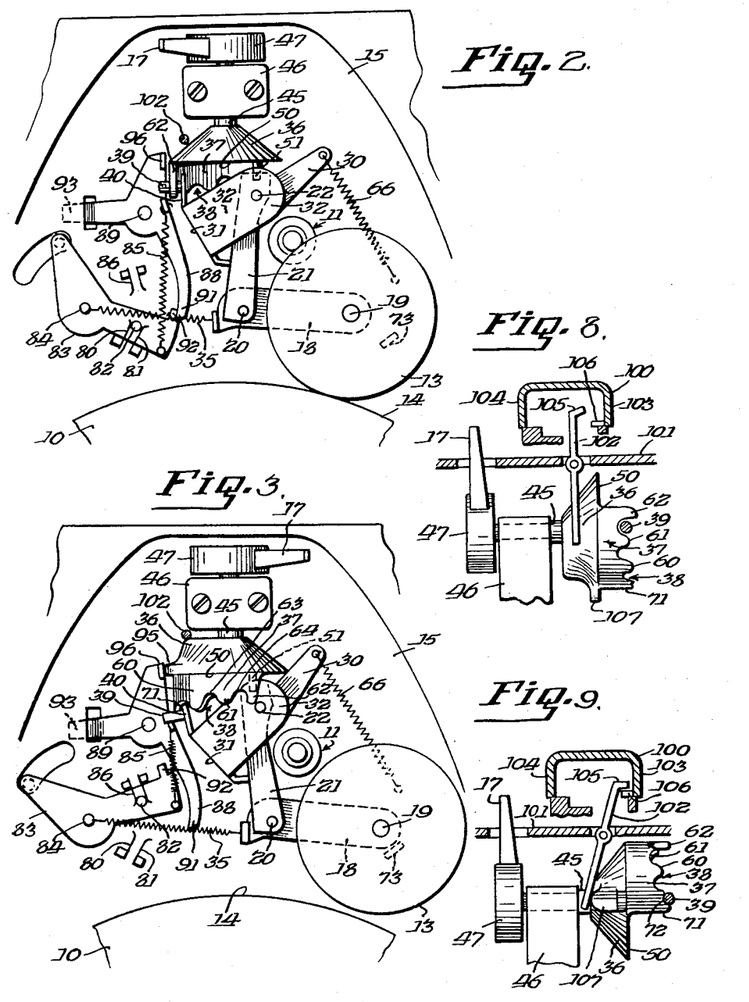
Fig. 2 is a plan view of the mechanism shown in Fig. 1, with the idler wheel located in drive relation between the motor and the record turntable.
Fig. 3 is a plan view of the mechanism shown in Fig. 1 with the idler wheel in fully disengaged position, out of drive relation with the motor and the record turntable.
Figs. 8 and 9 illustrate diagrammatically the portion of the mechanism shown in Figs. 2 and 3 which is used to hold the tone arm in its rest position.

In the arrangement and construction of this illustrative form of the invention, the idler wheel also is enabled to be located in a supplementary or "zero" position out of driving relation with the pulley and the turntable. Referring to Figs. 7 and 9 it will be observed that the control member 36 has, in addition to the teeth 60, 61, 62 the function of which have just been discussed, a fourth tooth 71 for coaction with the pin 39. This tooth 71 is provided with a curved top interrupted by an indentation 72 the purpose of which will be later described. The tooth 71, like teeth 60, 61 and 62, serves as a cam and coacts with a cam follower to impart movement to the idler wheel. Accordingly, by rotating the lever 17 to its extreme clockwise position, shown in Fig. 7, the idler wheel 13 is shifted laterally out of driving relation with the pulley 11 and the turntable 10. This position of the idler wheel is sometimes referred to as the "zero" position, since the idler wheel has been located out of contact with the turntable and the pulley and is, in effect, declutched from driving relation with both the motor and the turntable.

In the "zero" position, in the present instance; the end of lever 18 abuts a stud 73 mounted on the plate 15. The parts of the apparatus are so maintained by the construction and arrangement of the manual means and the cam and cam follower, the pin 39 functioning as a cam follower rises to the top of the cam surface provided by the tooth 71, there to be brought into position to slide into the indentation 72. The pin 39 is prevented from movement save that resulting from actuation of the manual means, and serves to hold the apparatus in the "zero" position.

In the illustrative form of the invention shown in Figs. 1–9, an actuating mechanism for the switch in the motor circuit is also present. This switch is provided to turn the turntable motor "on" and "off" to enable a record carried on the turntable to be played. This mechanism is depicted in Figs. 2 and 3, the switch comprising blades 80, 81 adapted to be closed by means of a pin 82 carried on a switch arm 83 mounted on the plate 15 for pivotal movement about a spindle 84. The switch arm 83 may be made of non-conducting material to insulate the switch from the rest of the apparatus while the pin 82 is preferably made of copper or aluminum to short the blades of the switch. In this instance, the actuating mechanism is normally urged toward the position where the switch is open (Fig. 3) by means of a spring 85 fastened at one end to a lever 88 and at the other end to the switch arm 83, where the pin 82 is held against a stop element 86 also carried on the plate.

The switch may be closed by introducing the pin 82 between the blades 80, 81 which is accomplished by rotating the switch arm 83 in a clockwise direction from the position of the mechanism shown in Fig. 3 to the position of the mechanism shown in Fig. 2. A handle or knob to operate the switch may for convenience be located above the plate supporting the change speed mechanism and connected to the switch actuating mechanism, or as in the embodiment of this invention illustrated in Figs. 2 and 3, the switch may be actuated from a tone arm mounted on the top of the frame 15 and normally supported on a rest but movable to play a record turned by the turntable 10. The tone arm is shown in Figs. 8 and 9, and the linkage between the tone arm and the switch actuating mechanism (not shown) may be of conventional construction such that movement of the tone arm into a record playing position causes the switch arm 83 to rotate to the Fig. 2 position where the switch is shown closed by the pin 82 introduced between the blades 80, 81 of the switch.

Normally, in the illustrative form of the invention, as shown in Fig. 3, the switch arm 83 is biased to the open circuit position by the spring 85. To close the switch contacts, the switch arm 83 is rotated clockwise, and in the present instance is held or latched in the closed circuit position by means included in the switch actuating mechanism. This means comprises a holding member or lever 88 mounted for pivotal movement on the plate 15 by a shaft 89. The holding member or lever 88 and the switch arm 83 are mounted in the apparatus to be operated together as by movement of the tone arm, so that simultaneously upon actuation of the switch arm 83 to the closed circuit position, the tip 91 of the member 88 is brought into registration with a notch 92 cut in the side of the switch arm. The parts of the mechanism are shown, as noted previously, in the closed circuit position of the switch in Fig. 2.

Means are also provided for opening the switch as for example, incident to the tone arm reaching the end of a record, including in the present instance, means to trip lever 88 out of engagement with switch arm 83, and breaking the circuit with the turntable motor by opening the switch. Thus the pivotal member 88 is arranged with an arm 93 engageable with the tone arm, or a linkage connected thereto, and such that as the tone arm in its horizontal pivotal movement reaches the end of a record, the member 88 is rocked counterclockwise and separated from engagement with the switch arm 83. The switch arm then being free to move under the urging of spring 85, pivots counterclockwise until the pin 82 abuts the stop 86 provided therefor in the apparatus. This position of the parts and elements comprising the switch actuating mechanism is shown in Fig. 3.

With this construction and arrangement, the switch actuating mechanism is responsive to the position of the tone arm, such that the turntable motor circuit is closed and the turntable motor operated when the tone arm is positioned over the edge of the record in playing position, and the turntable motor circuit broken and the motor disconnected from the line when the tone arm is positioned at the end of the record.

The switch actuating mechanism, controlled as it is by the position of the tone arm, in the present instance operates independently of the speed change mechanism illustrated in Fig. 1 and previously described. Consequently the turntable motor may be connected to the line for operation when the idler wheel 13 is located in the "zero" or supplementary position out of driving relation with the driving pulley 11 and the turntable 10.

Normally the moving turntable serves as an "on-off" indicator for the turntable motor. In the mechanism depicted in Figs. 1–9, however, as just described, with the idler wheel 13 located in the "zero" or supplementary position the motor may be operating, without the knowledge of the operator, if the switch in the motor circuit is closed.

To prevent this from occurring, in the illustrative form of the construction means are included to prevent the turntable motor switch from remaining closed during periods the idler wheel 13 is located in its "zero" or supplementary position. In the present instance, the means comprises a cam mechanism provided on and operative coincidentally with control member 36, including a projection 95 on the periphery of the member adapted to engage a flange 96 formed on the latch member 88. The projection 95 is so located on the circumference of the control member 36 as to engage the flange 96 on the latch member 88 when the control member 36 is positioned to locate idler wheel 13 in its supplementary position out of engagement with the pulley 11 and the turntable 10. As shown in Fig. 3, when the lever 17 is rotated to its extreme clockwise position, so as to shift the idler wheel 13 laterally to the "zero" position the projection 95 bearing against the latch member 88 imparts counterclockwise movement thereto causing the tip 91 of the member to be separated from engagement with the switch arm 83 thus enabling the switch arm 83 to pivot and open the switch.

Thus the switch arm 83 is permitted to move, without interference, in response to movements of the tone arm between positions where the switch is closed or open, but the latch means for holding the switch closed is rendered inoperative during periods the idler wheel is located in its "zero" or supplementary position out of driving relation with the pulley and the turntable.

In Figs. 8 and 9 a mechanism restraining tone arm movement is illustrated, which mechanism may form a part of the apparatus shown in Figs. 1–7. As shown the tone arm 100 is supported for pivotal movement above a shroud 101 concealing the working parts of the apparatus from view, and is supported so as to be movable into position to play a record turning on the turntable. In this instance the tone arm restraining means comprises a link 102 which is pivotally supported on the plate 101 to extend above the plate for engagement with the tone arm 100 and to depend below the plate for engagement by the control member 36. The link 102 is of such length as to extend between the side walls 103, 104 of the tone arm 100 and has an angularly extending toe 105 intended to fit over an inwardly turned lip 106 formed below the side 103 of the tone arm 100. This mechanism may be employed to hold the tone arm on its rest, and prevent movement toward the turntable when the idler wheel 13 is locked in its "zero" or supplementary position out of driving relation with the pulley and the turntable. In order to actuate the link 102, the control member 36 may be provided with a lug 107 engageable with the free end of the link 102 for rocking the link into engagement with the tone arm when the control member 36 is positioned to shift the idler wheel out of engagement with the pulley and the turntable. Thus the lug 107 is positioned on the opposite side of the control member 36 and aligned with the tooth 71, which with pin 39 serves to shift the idler wheel into the "zero" position.

In the operation of a phonograph apparatus provided with the illustrative restraining means, manually locating the lever 17 in its extreme clockwise position (as viewed in Fig. 7) causes the lug 107 on the control member 36 to bear against the depending free end of the link 102. This link as a result rocks about its pivotal support and engaging the lip 106 on the tone arm, restrains the tone arm against movement. This position of the link is depicted in Fig. 9, while the normal position of the link 102 is shown in Fig. 8 where free movement of the tone arm 100 is permitted.

The phonograph apparatus depicted in Figs. 1–9 and hereinbefore described thus comprises manually operated means for changing turntable speeds, and as a feature includes means whereby the idler wheel may be shifted into a supplementary or "zero" position out of driving relation with the turntable and the stepped pulley carried on the motor shaft. Further, the apparatus is constructed and arranged with a switch in the motor circuit actuable to turn the motor "on" and "off" by means operatively connected with the tone arm, means for holding the tone arm on its rest also being included in the apparatus, which means is effective only when the idler wheel is shifted into the "zero" position.

Another form of this invention, which pertains to the actuating means for the switch in the motor circuit is shown in Figs. 10 through 14. In general the switch actuating means and the manually operable turntable change speed means shown therein correspond with the means described in connection with Figs. 1–9. Thus, a control member 36 manually rotatable by a lever 17 is supported on a mounting plate 15, and arranged in close proximate relation thereto as part of the apparatus, is a switch means movable between an "on" position depicted in Fig. 10 and an "off" position depicted in Fig. 11.

Figure 12:
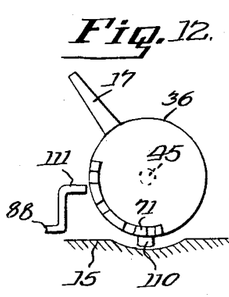
Figs. 12, 13 and 14 are diagrammatic views showing elements of the mechanism depicted in Figs. 10 and 11 in various positions.
Figures 13, 14:
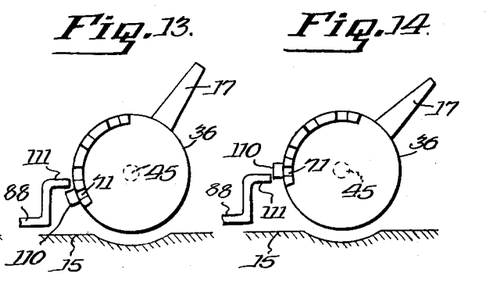

As in the previous instance, means are provided for tripping the switch mechanism upon the occasion of the idler wheel being shifted into the "zero" position. In the present instance, however, this means comprises a laterally extending lug 110 carried on the peripheral edge of the control member 36, and interengageable with a flange 111 borne by the latch member 88. Thus as shown in Figs. 12 through 14, as the lever 17 is rotated from its extreme counterclockwise position the lug 110 is brought into engagement with the flange 111 on the latch member 88 resulting in a displacement of the latch member in a counterclockwise direction as viewed in Fig. 11, and a corresponding displacement of the tip 91 thereof out of engagement with the switch arm 83. This results in freeing the switch arm 83 and enables the spring 85 to operate and urge the switch arm toward the open circuit or "off" position depicted in Fig. 11.

Figures 10, 11:
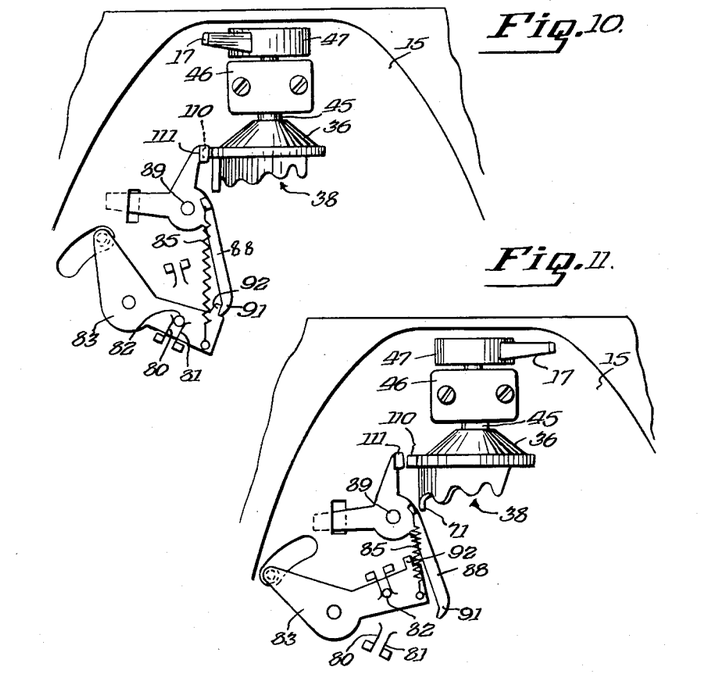
Figs. 10 and 11 are plan views showing in different positions, another construction for the portion of the mechanism of Fig. 1 relating to the trip means employed in connection with the line switch for the motor.

The lug 110 is so located on the control member 36 as to trip the mechanism and free the switch arm only when the idler wheel is shifted and held out of driving relation with the pulley and the turntable in the "zero" position. Thus the lug 110 is located adjacent to and in axial alignment with the tooth 71 on the crown on the face of the control member 36, which tooth operates as a cam to shift the idler wheel support and thus the idler wheel to its "zero" position and locks the idler wheel in this position out of driving relation with the pulley and turntable.

For purposes of clarity the various positions of the control member 36, the lug 110 and flange 111, are shown in Figs. 12–14, and it may be observed that as the control member rotates and the lug is brought in contiguous relation with the flange, the flange is dispatched laterally to effect the desired movement of the latch member 88.

Figure 15:
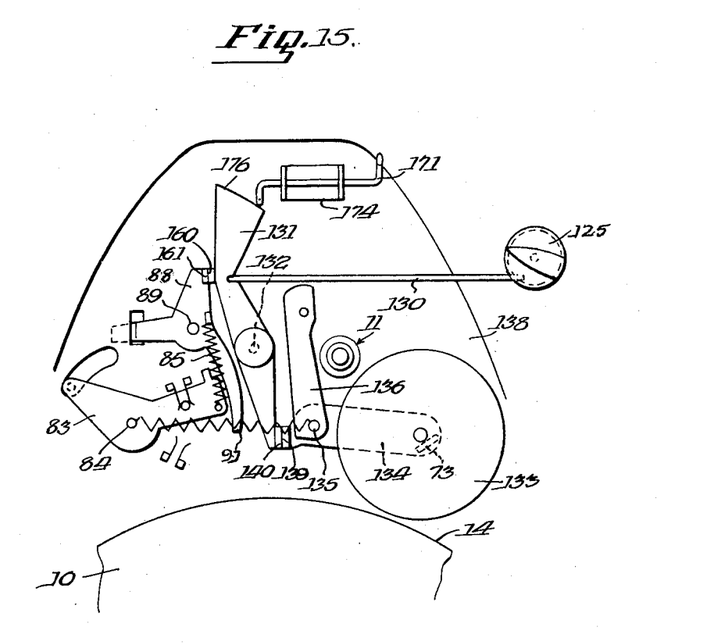
Fig. 15 is a plan view showing another construction for the mechanism for shifting the idler wheel to the declutched or "zero" position out of drive relation with the motor and the record turntable.
Figure 16:
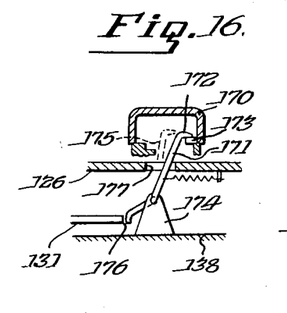
Figs. 16 and 17 are diagrammatic views of portions of the mechanism shown in Fig. 15.
Figure 17:
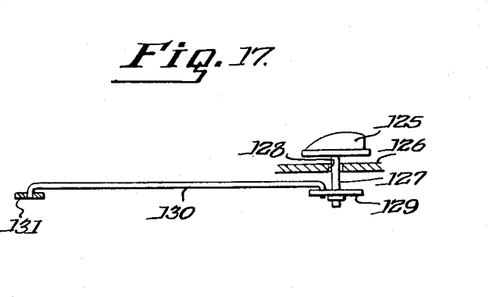

A further form of the invention, applicable particularly to the means for shifting the idler wheel laterally to a "zero" position into and out of engagement with the pulley and the turntable, is illustrated in Figs. 15 through 17. In the present instance, for purposes of ease in description, the means for raising and lowering the idler wheel vertically to change turntable speed is not illustrated, however, a similar mechanism to that shown in Figs. 1 through 9 may be employed in conjunction with the means shown in Figs. 15 through 17 to comprise a complete turntable change speed mechanism.

In place of the manually operable handle and rotatable control element used in the forms of this invention hereinbefore described, the modified arrangement illustrated in Figs. 15 through 17 may be employed, where a knob 125 carried above the shroud 126 concealing the apparatus from view, is used to actuate the mechanism. To connect the knob with the change speed mechanism, the knob 125 is splined on a shaft 127 which extends through an aperture 128 in shroud 126 and carries a disk 129 connected, by means of a draw rod 130, to a control member 131 pivotally supported by means of a vertical pin 132. The control member 131 in turn actuates the support for the idler wheel 133, shown herein as a flat member 134, supported for pivotal movement on a pin 135 carried on a link 136 which itself is supported for oscillatable movement on the mounting plate 138. With this arrangement the means for raising and lowering the idler wheel may be connected to the link 136 and the member 134, and operates independently of the control member 131 which is employed to shift the idler wheel 133 out of driving relation with the pulley and the turntable. Upon release of the control handle 125 the idler wheel is allowed to be returned to driving relation by the spring attached between the pin 84, which is fixed against lateral movement in the apparatus, and the pin 135 which is part of the idler wheel support.

In this illustrative form of the invention, lateral movement of the idler wheel 133 is achieved by providing one end of the control member 131 with a flat flange 139 abutting a straight edge 140 formed on the end of lever 134, the abutting relation of these members being provided so that movement of the control member 131 is transmitted directly to the lever.

The same switch actuating mechanism as was described both in connection with Figs. 1 through 9 and Figs. 10 through 14 is herein incorporated, comprising a switch arm 83 shown in the "off" position in Fig. 15.

Means are also provided, as in the previous instances, whereby the switch mechanism is tripped upon the idler wheel being shifted into the "zero" position. In this form of the invention, the control member 131 is provided with a lug 160 adapted to engage a projection 161 carried on one end of the latch member 88. Thus when the control member 131 is pivoted to its extreme counterclockwise position by means of knob 125 being rotated clockwise, the lug 160 is brought into engagement with the projection 161 on the latch member 88 urging the latch member counterclockwise about its pivot 89 and disengaging the tip 91 of the member from the end of arm 83. This action trips the switch and enables the switch arm 83 to shift to the "off" position of Fig. 16 under the urging of the spring 85 fastened thereto.

In the illustrative form of the invention illustrated in these Figs. 15–17, means are also provided preventing movement of the tone arm when the idler wheel has been shifted out of driving relation with the stepped pulley and the turntable in its "zero" position. As shown in Fig. 15, when the tone arm 170 is located in its rest position it is engaged by a link 171. In order to engage the tone arm 170, the link 171 is formed with an offset toe 172 adapted to engage a lip 173 formed on the lower edge of one side of the tone arm. The link 171 is pivoted on a bracket 174 carried on the frame 138 and moves from the position shown in dotted lines 175 where it is out of engagement with the tone arm 170 to the position shown in full lines where it engages the tone arm to prevent it from moving. The control member 131 actuates the link 171, the lower free end of the link being bent at right angles to engage a camming edge 176 formed on the control member.

Movement of the control arm 131 by means of knob 125 thus causes the link 171 to pivot in a slot 177 formed in the shroud 126 from the position shown in dotted lines in Fig. 16 to the position shown in full lines in this same figure where the link 171 is engaged with the tone arm 170.

Thus the tone arm is prevented from being moved into playing relation with the record, and from operating the switch to connect the motor to the line when the idler wheel has been shifted to the "zero" position. The motor driving the turntable may be energized, therefore, only during periods the idler wheel 134 is in contact both with the pulley and the turntable, and the mechanism shown in detail in Fig. 16 prevents the switch from being actuated by the tone arm when the idler wheel 134 is out of driving relation with the turntable.

Figure 18:
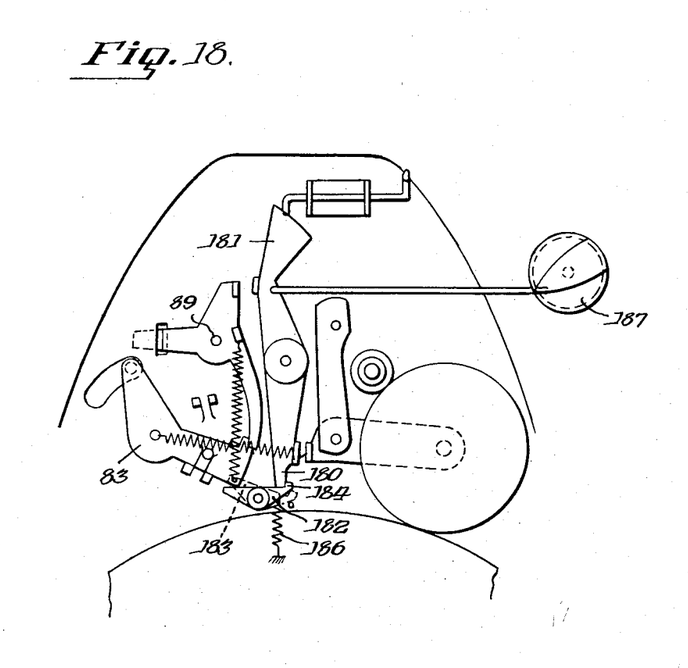
Fig. 18 is a plan view of another construction for the trip means employed in connection with the motor switch.

In Fig. 18 a mechanism is shown intended for incorporation in the form of this invention illustrated in Figs. 15 through 17. This mechanism is employed to prevent the idler wheel from being shifted out of driving relation between the turntable and the pulley when the motor switch is closed.

As hereinbefore noted, when the idler wheel is located in its "zero" position out of driving relation with the pulley and the turntable, the turntable can no longer serve as an on-off indicator for the motor. Thus the motor may operate for extended periods without the knowledge of the operator, causing damage to the motor through overheating. The mechanism illustrated in Fig. 18, therefore, prevents the idler wheel from being shifted out of driving relation with the turntable and the pulley during periods the motor is connected to the line, thus eliminating the possibility that the motor may be operating without load.

The change-speed mechanism of Fig. 18 is similar to that shown in Fig. 15, and the switch actuating mechanism is likewise similar. The free end 180 of the control member 181, however, is adapted to be engaged by a latch 182 pivotally supported to move between the dotted position 183 and the position shown in full lines in Fig. 18. To hold the control member 181, the latch 182 is formed with a tooth 184 which holds the control member 181 when the switch arm 83 is in position to close the blades of the switch. With the switch arm 83 in this position, the end of the switch arm engages the latch 182 and holds the latch against the action of a spring 186 tending to rotate the latch 182 clockwise about its pivot. The tooth 184 on the latch 182 by engaging the lower end 180 of the control member 181, prevents the control member 181 from moving in a counterclockwise direction about its pivot to locate the idler wheel out of driving relation with the turntable and the pulley.

Moving the switch arm 83 to open the blades of the switch, permits the latch 182 to rotate clockwise about its pivot to the dotted position shown in Fig. 18, disengaging the tooth 184 from the lower end of the control member 181. The control member 181 is then permitted to move without interference and may be operated by the actuating knob 187 to shift the idler wheel with relation to the turntable and the pulley.

Another exemplary form of this invention is shown in

Figure 19:
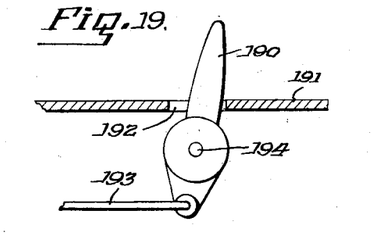
Fig. 19 is a diagrammatic view of an actuator for shifting the idler wheel assembly.

Fig. 19 pertaining to the manually operated means for operating the mechanism shown in Fig. 15 particularly, the mechanism for shifting the idler wheel into and out of driving relation with the turntable and the driving pulley.

Phonograph apparatus is manufactured for use in home, car, office and industry, and one particular form of manual operating means may be more desirable in one of these applications than in another. Various illustrative forms of the invention have been illustrated and described hereinbefore particularly relating to means for shifting the idler wheel and switch actuating means for phonograph apparatus, in each instance manually operated by means of a linkage from a member manipulable by the operator. In Fig. 19, and hereinafter to be described in connection with Figs. 20–36, different forms of the manually operable members per se are shown, in every case intended for purpose of illustration but not limited for use in the apparatus previously described.

In the present instance (Fig. 19), in place of the knob 125 used in the apparatus illustrated in Fig. 15, a lever 190 pivotally supported below the shroud 191 (to conceal the parts of the apparatus from view) and extending through a slot 192 to project above the shroud actuates a draw rod 193 employed like the draw rod 130 of Fig. 15, to operate a control member positioning the parts of the change-speed mechanism. The lever 190 may be pivotally mounted on a shaft 194 held in a bracket or other similar device (not shown), and oscillated back and forth in the slot 192, to move the draw rod 193 to which it is connected.

Figures 20, 22:
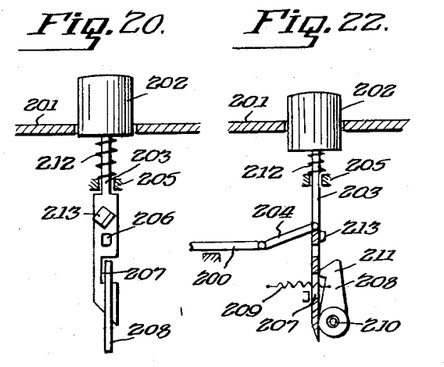
Figs. 20 through 25 illustrate a push button form of actuator for shifting the idler wheel assembly.

The manually operable member and means may take still another form, as shown in Figs. 20 through 25, where a push buttton device is illustrated. The push button produces movement of a draw rod 200 which may be connected to actuate a change-speed mechanism like that illustrated in Fig. 15. Referring to Fig. 20, in this instance the draw rod 200 is supported below a shroud 201 and connected to a control member operating the change-speed mechanism. To produce movement of the draw rod 200 the push button 202 is fastened to an operating rod 203 which in turn is pivotally joined to a connecting link 204 carried on the end of the draw rod 200. By depressing the push button 202 the toggle linkage formed by the draw rod 200 and the connecting link 204 is straightened moving the draw rod 200 toward the left in Fig. 21, which motion may be translated by a control member to actuate the elements of the change-speed mechanism.

To control the movement of the rod 203, it is slidable within guides 205 rigidly fastened on the frame of the phonograph apparatus. The lower end of the rod 203 is shaped as a wide plate formed with an opening 206, and along one edge with a notch 207. A locking pawl 208 biased by a spring 209 is mounted on a shaft 210 to pivot toward and away from the plate portion of the rod 203, and has a nose 211, which in the rest position of the push button 202 (Fig. 21) enters the notch 207 to bear against the lower edge of this notch.

To actuate the change-speed mechanism and locate the idler wheel out of driving relation both with the turntable and the pulley, the push button 202 is depressed to lower the rod 203. This results in a straightening of the toggle linkage formed by connecting link 204 and the draw rod 200 and motion of the draw rod 200 toward the left in Fig. 21 which is translated through the change-speed mechanism to movement of the idler wheel support to locate the idler wheel in its "zero" position.

Figure 23:
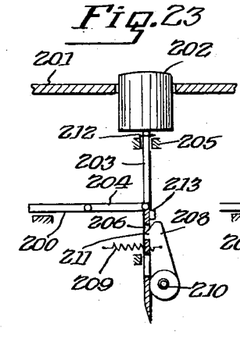

To cam the pawl 208 out of the notch 207 the forward edge of the nose 211 on the pawl 208 is slanted for engaging the upper edge of the notch 207. Downward movement of the rod 203, initially causes the pawl 208 to pivot about its supporting shaft 210, and finally (Fig. 22) brings the opening 206 into registry with the nose 211 of the pawl 208. To latch the rod 203 in a fully depressed position the spring 209 urges the nose 211 of the pawl 208 into the opening 206 (Fig. 23).

This produces, through the draw rod 200 and the change-speed mechanism, movement of the idler wheel to its "zero" position out of driving relation with the turntable and the pulley.

Figure 24:
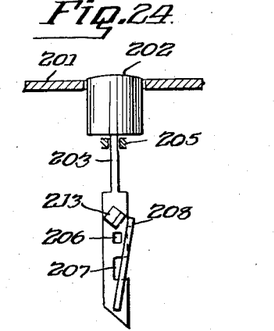
Figure 25:
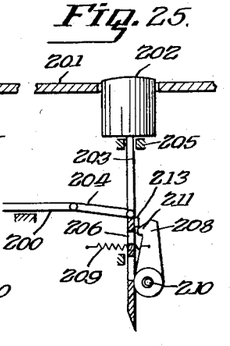

To release the rod 203 and allow vertical movement of the push button 202 under the urging of spring 212 to its raised position, the push button 202 is pressed further downwardly so as to engage the slanted front edge of the pawl 208 against an inclined angle member 213 fixed to the plate portion of rod 203 between the connecting link 204 and the opening 206. This angle member 213 is located just above the opening 206 and as shown in Figs. 24 and 25 forces the pawl 208 to pivot laterally to one side of the edge of the plate on the lower end of the rod 203. In order to permit this movement, the pawl 208 may be loosely journaled on the supporting shaft 210 in such a manner as to enable the pawl 208 to pivot both toward and away from the rod 203 and laterally to one side of the rod 203.

Figure 21:
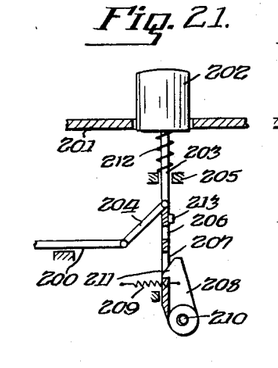

As shown most clearly in Fig. 24, when the pawl 208 is positioned to one side of the lower blade portion of the rod 203 the nose 211 thereof, under the action of spring 209, may be urged past the edge of the rod 203 out of registration with the opening 206. Under the urging of the spring 212, the rod 203 automatically rises, the pawl 208 sliding down the vertical edge of the lower plate portion of the rod 203 until positioned adjacent the notch 207, when the nose 211 of the pawl enters the notch, allowing the pawl to return to its vertical position as shown in Fig. 21. The pawl 208 is resiliently urged to this vertical position by arranging the spring 209 angularly so as to exert a lateral force against the pawl tending to maintain the pawl in an erect position. Other biasing means to return the pawl 208 to vertical alignment, may be employed, as desired.

The push button assembly shown in Figs. 20 through 25 provides a simple operating mechanism for shifting the idler wheel support into a location out of driving relation with the turntable and the driving pulley. In the arrangement shown in these figures, however, no control means is illustrated to operate a change-speed mechanism like that shown in Figs. 1 through 9, where a plurality of positions of the control member are required, and it is intended that the change-speed mechanism be actuated independently of the mechanism for shifting the idler wheel into a "zero" position out of driving relation with the pulley and the turntable.

In Figs. 26 through 34 is illustrated still another form of the manual means for actuating the mechanism to locate the idler wheel in its "zero" position out of driving relation with the turntable and the pulley. In this instance, the mechanism for locating the idler wheel in its supplementary position is intended to be entirely independent of the change-speed mechanism portion of the phonograph apparatus, as was the case with the forms of this invention illustrated in Figs. 19 through 25.

In place of a knob, a button or a lever, the actuating means in this instance is the rest 220 for the tone arm 221. The rest 220 is arranged to be lowered by the weight of the tone arm when it is on the rest and raised by the action of a spring (not shown) when the tone arm is moved into playing position over a record. A linkage is also incorporated in this form of the invention, to hold the tone arm 221 on the rest 220 when the idler wheel is located in its "zero" position out of driving relation with the turntable and the pulley.

To operate the mechanism for shifting the idler wheel, a draw rod (not shown) or other similar linkage means, may be employed fastened to a pivotally mounted lever 222 positioned below the rest 220. To actuate the pivotally mounted lever 222, the rest 220 carries a downwardly projecting bar 223 formed with a laterally extending tooth 224. The lever 222 is provided with a slanted forward edge 225 adapted to be engaged by the tooth 224 when the bar 223 is moved in a downward direction for camming and rocking the lever about its pivot 226, which motion is translated through the draw rod (not shown) to the idler wheel to locate the idler wheel in its "zero" position.

Figures 29, 33:
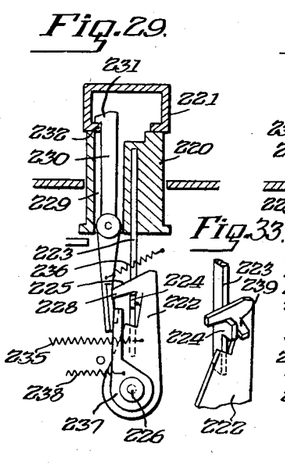

The mechanism shown in Figs. 26 to 34 is so arranged that after the tone arm 221 has been placed on the rest 220 and the rest lowered, the parts of the mechanism are locked and the tone arm is prevented from being removed from the rest. This position of the mechanism is shown in Fig. 29, where the tooth 224 is locked below the lower edge 227 of the nose 228 carried by the pivotal lever 222. The tone arm rest is thus prevented from returning to its raised position. Means are also provided to hold the tone arm 221 from movement, in this instance, the rest has a lever 230 formed with a toe 231 adapted to engage and fit over a lip 232 provided on the lower edge of one side of the tone arm 221. The lever 230 is pivotally mounted within a vertical passageway 229 in the rest. The lever 230 is pivotable into and out of engagement with the tone arm, the disengaged position being shown in Fig. 26, while the engaged position is shown in Fig. 29.

Normally the lever 230 is held with the toe portion 231 thereof out of engagement with the tone arm 221, by the end of the nose 228 of the member 222 (Fig. 26), which is urged in a counterclockwise direction about its pivot by a spring 235 fastened at one end of the frame supporting the apparatus. To cause positive movement of the lever 230, the lever is biased in a counterclockwise direction by means of a spring 236 fastened to the lower end of the lever and also connected to the frame supporting the apparatus. To position the parts in the arrangement shown in Fig. 26, it is necessary that the spring 235 be slightly stronger than the spring 236.

Figures 26, 27, 32:
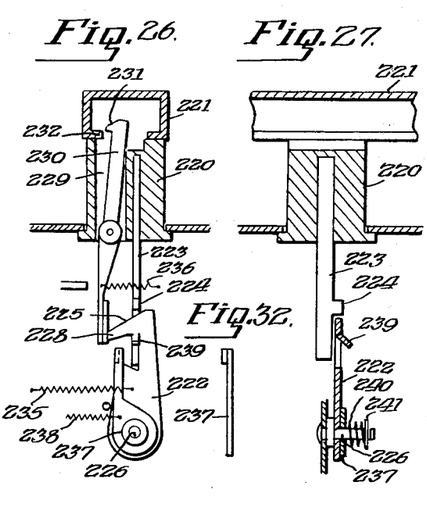
Figs. 26 through 36 illustrate further forms of actuator for shifting the idler wheel assembly.
Figure 28:
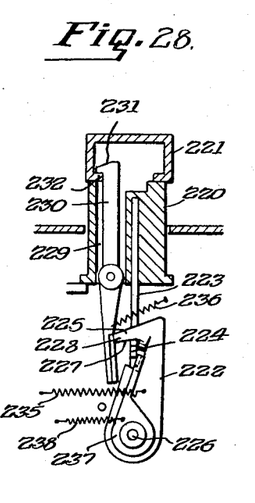

A pawl 237 mounted on the same shaft 226 which supports member 222 is employed as a mechanism to exert an additional force on the lever 230 to separate it from the tone arm as the parts return from the position shown in Fig. 29 to the position shown in Fig. 26. Accordingly, the pawl 237 is pivotally mounted on shaft 226 with a loose fit thereon, so that the pawl 237 as well as the member 222 may pivot in a lateral direction (Fig. 21) and toward and away from the lever 230 as the parts shift from one position to another. This pawl 237 is urged in a counterclockwise direction by a spring 238 which is a lighter spring than spring 236 acting on the lever 230 engaging the tone arm.

To release the bar 223 and allow the parts to reassume the raised position shown in Fig. 26 a laterally extending finger 239 is formed on the member 222, extending obliquely downwardly from a point located approximately at the junction between the nose 228 and the body of the member 222.

Figures 30, 31, 34:
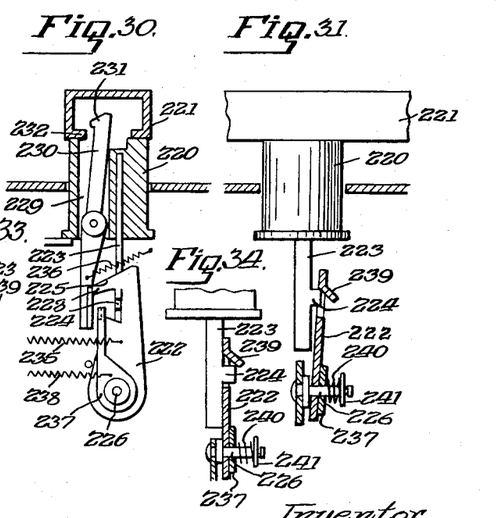

The locked position of the tone arm 221 is shown in Fig. 29. To release the tone arm and permit the rest to raise under the action of a spring, the tone arm and rest are pressed downwardly to the position shown in Fig. 30 when the tooth 224 fits under the obliquely extending finger 239 formed on the member 222. This is produced by the action of member 222 responding to the urging of the spring 235 tending to rotate this member in a counterclockwise direction. Under the action of the spring tending to raise the support, the bar 223 slides vertically and the tooth 224 operating against the inclined lower surface on the finger 239 cams the member 222 in a lateral direction as shown in Fig. 31. The tooth 224 then is extricated from below the nose 228 on the member 222 and the bar 223 and the support 220 continue to rise vertically to the position shown in Fig. 26.

Forward pivotal movement of the member 222 also serves to release the tone arm 221. This is the result of the nose 228 on the member 222 engaging the lower end of the lever 230 thus rotating the lever clockwise about its pivot and disengaging the toe 231 from the side of the tone arm 221. The pawl 237, when the support is locked in its lower position, engages the lower end of the lever 230, and is pressed against the lever by the spring 238 urging the pawl 237 in a counterclockwise direction. Very slight additional force is thus required to move the lever 230 clockwise to separate the lever from the tone arm 221, this very slight additional force being produced by the forward pivotal motion of the member 222, the result of the bar 223 being separated from the member 222 by means of the relative movement and camming action between the tooth 224 carried on the bar and the finger 239 carried on the member.

As the rest 220 rises to its uppermost position (Fig. 31) the member 222 and the pawl 237 are pivoted laterally as has been described hereinbefore. In order that the pawl 237 and the member 222 reassume a vertical position, these parts are urged by a compression spring 240 supported about the shaft 226 and bearing against the face of the pawl 237 and a disk 241 carried on the end of the shaft 226. After the tooth 224 has been raised above the member 222 and out of engagement therewith, both the member 222 and the pawl 237 will automatically reassume a vertical position under the action of spring 240, as shown in Fig. 26.

Figure 35:
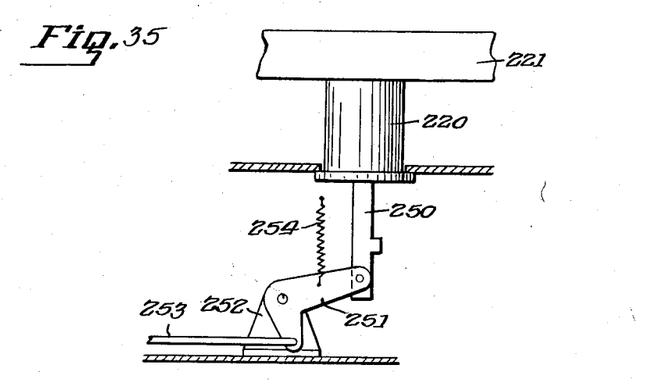
Figure 36:
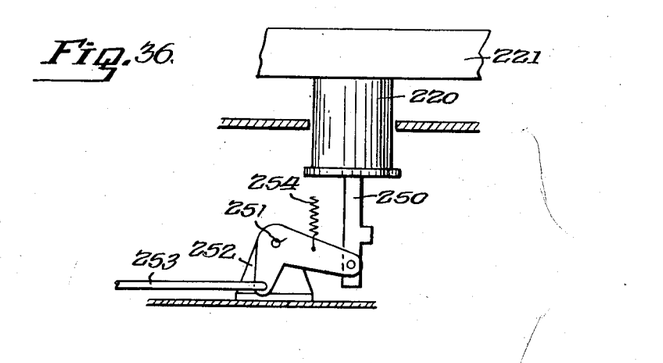

As mentioned in connection with the form of this invention illustrated in Figs. 26 through 34 and just described, a draw rod and toggle linkage may be pivotally mounted on member 223, to translate motion of the member and actuate the idler wheel mechanism. In Figs. 35 and 36 another linkage construction is illustrated, where in place of the draw rod and toggle, a bell crank 251 pivotally supported on a bracket 252 and fastened to a draw rod 253 is employed. In this instance the bell crank is actuated by a bar 250 depending from the tone arm rest 220 and the draw rod 253 extends to the idler wheel mechanism. A spring 254 may be employed to automatically return the tone arm rest 220 to the raised position, the spring being selected so that the weight of the tone arm 221 is sufficient to lower the rest against the action of the spring. The raised position of the rest is shown in Fig. 35 while the lowered position of the rest is shown in Fig. 36. It is noted that the mechanism illustrated in Figs. 26 through 34 may be employed to lock the rest in its lowered position, however for purposes of clarity the elements of this mechanism are not shown in Figs. 35 and 36.

Although the mechanisms for shifting the idler wheel to its "zero" position shown in Figs. 1 through 9 and 15 through 17, include means for operating a switch intended to be connected in circuit with the motor, it will be understood that the idler wheel mechanism may be independent. Likewise the switch actuating mechanism shown in these figures and in Figs. 10 through 14 may be employed in apparatus including neither the change-speed mechanism nor the mechanism illustrated for locating the idler wheel in the "zero" position out of driving relation with the pulley of the turntable.

In the first form of this invention illustrated in Figs. 1 through 9, however, both a change-speed mechanism and a switch actuating mechanism are included as part of the apparatus. Through use of this apparatus the turntable speed may be changed from one speed to another depending on the record to be played. Furthermore, an important safety feature is included, preventing the switch actuating mechanism from operating to close the switch and connect the motor to the line, when the change-speed mechanism is actuated to locate the idler wheel out of driving relation with the turntable and the pulley.

Modifications of this apparatus disclosed in the remaining Figs. 10 through 36, relate to alternative constructions for certain portions of the mechanism, which may be used to provide advantages which in certain types of phonographic apparatus may be deemed particularly desirable.

Other variations of this invention will be apparent to one skilled in the art, and it is not intended that the invention be limited to the specific forms illustrated and described. The scope of the invention should be determined only by the appended claims.

I claim as my invention:

1. In a phonograph apparatus having a motor driven stepped driving pulley, a record turntable, an idler wheel engageable with said stepped pulley and said record turntable, and a frame supporting the record turntable and said motor driven stepped driving pulley in fixed relation, the combination of a pin mounted on the frame, a lever supporting said idler wheel pivoted on said pin for horizontal movement and slidable on said pin for vertical movement, an arm pivotally supported on said pin, said arm being engageable with said lever for pivoting said lever horizontally, a control member supported on said frame for rotation about a horizontal axis, a stud carried by said control member offset from the axis of rotation thereof and forming a cam, said lever being provided with a horizontal slot for receiving said stud and forming a cam follower, rotation of said control member producing vertical movement of said lever through said stud and slot cam connection, camming mechanism comprising a cam carried by said control member and a cam follower carried by said arm adapted to pivot said arm in a horizontal direction to engage said lever and move said lever horizontally, whereby movement of said control member adjusts said lever horizontally and vertically simultaneously to shift the idler wheel out of relation with said driving stepped pulley and from level to level for engagement with a different step of said stepped pulley.

2. In a phonograph apparatus having a motor driven pulley, a turntable, an idler wheel engageable with said pulley and said turntable, and a tone arm adjustable from a rest position to a position for playing a record carried on said turntable, the combination of a horizontally movable support for the idler wheel normally spring urged toward a drive position wherein the idler wheel is wedged in drive relation between the periphery of the turntable and the pulley, said support being movable horizontally to a zero position thereby to shift said idler wheel into a fully disengaged position out of driving relation with the turntable and the pulley, a movable control member having positions corresponding to the zero and drive positions of the idler wheel support, a cam connection between said control member and said support for shifting the latter horizontally to accord with the position of the control member, and means actuatable by said control member in conjunction with shifting the idler wheel support for locking the tone arm in rest position to prevent said tone arm from being brought into contact with a record on the turntable; said last-named means including a lever pivotally mounted on a fixed axis and having one end arranged to fit over an edge of the tone arm to lock the latter upon pivotal movement of the lever to the locking position, and means connected to the control member and coacting with the other end of the lever to pivot the lever into the locking position upon movement of the control member to the zero position.

3. In a phonograph apparatus having a motor driven pulley, a turntable, and an idler wheel engageable with said pulley and said turntable, the combination of a movable support for the idler wheel, said support being movable from a drive position to a zero position to shift said idler wheel to a fully disengaged position out of driving relation with the turntable and the pulley, a control member for shifting said idler wheel support having a drive and a zero position corresponding to the position of the idler wheel support, a switch in circuit with the motor, an actuating mechanism for said switch operable by means independent of said control member so that said switch may be opened and closed to open and close the circuit to the motor, a holding member connected to said switch for normally holding the same in the closed position, and trip means between the control member and the actuating mechanism for said switch and operable to shift said holding means to release and open the switch and the circuit to the motor, said trip means including a connection between the control member and said holding member arranged to operate the latter when the control member is moved to shift the idler wheel to the fully disengaged position.

4. In a phonograph apparatus having a motor driven pulley, a turntable, an idler wheel engageable with said pulley and said turntable, and a normally open switch in circuit with the motor, the combination of a support for the idler wheel, said support being movable to shift said idler wheel into a fully disengaged position out of driving relation with the turntable and the pulley, a control member operatively connected to said support for shifting said idler wheel, and a trip mechanism for said switch including an arm pivotable between two extreme positions to open and close the switch, a lever engageable with said arm to latch said arm in one extreme position whereby said switch is closed, and means connecting said control member and said lever for moving said lever out of engagement with said arm when the idler wheel is shifted to the fully disengaged position to enable movement of said arm toward the second extreme position whereby said switch opens to break the circuit with the motor.

5. In a phonograph apparatus having a motor driven stepped pulley, a record turntable, an idler wheel engageable with said pulley and said record turntable, a switch in circuit with the motor, and a frame supporting the record turntable and said pulley in fixed relation, the combination of a lever supporting said idler wheel, said lever being arranged on said frame for horizontal movement with relation to said turntable and said pulley and for vertical movement relative thereto, an arm pivotally supported on said frame, said arm being engageable with said lever for moving said lever horizontally, a control member supported on said frame for rotation about a horizontal axis, a stud carried by said control member offset from the axis of rotation thereof and forming a cam, said lever being provided with a cam follower whereby rotation of said control member produces vertical movement of said lever through said cam and cam follower connection to adjust the vertical levels of said idler wheel, cam means carried by said control member and a cam follower carried by said arm adapted to pivot said arm in a horizontal direction to engage said lever and move said lever horizontally, said cam means providing a plurality of horizontal movements for said lever whereby one of said plurality of movements locates said idler wheel in a fully disengaged position out of driving relation with said pulley and said turntable and others of said plurality of movements adjust said lever horizontally to shift the idler wheel out of driving relation with said pulley and said turntable to permit said idler wheel to be moved from level to level for engagement with a different step of said stepped pulley, and an actuating mechanism for said switch including an arm mounted on said frame pivotable between two extreme positions to open and close the switch, latch means mounted on said frame and engageable with said arm to hold said arm in one position whereby said switch is closed, and a trip connection between the control member and said latch means effective upon actuation of said control member to shift said idler wheel into the fully disengaged position out of driving relation with the pulley and the turntable to free said arm for movement to the second extreme position whereby said switch opens and the motor circuit is broken.

6. In a phonograph apparatus having a motor driven pulley, a turntable, and an idler wheel engageable with said pulley and said turntable, the combination of a support for the idler wheel, said support being movable to shift said idler wheel to a disengaged position out of driving relation with the turntable and the pulley, a control member for shifting said idler wheel support, a switch in circuit with the motor, an actuating mechanism for said switch including stop means, said control member being engageable with said stop means to prevent movement of said idler wheel support when the switch is closed to prevent said idler wheel from being disengaged from the pulley and the turntable when the motor is operating, and trip means between the control member and the switch actuating mechanism effective to open the switch and the circuit to the motor to prevent the motor from operating when the idler wheel is located in its disengaged position.

7. In a phonograph apparatus having a motor driven pulley, a turntable, an idler wheel engageable with said pulley and said turntable, and a switch in circuit with the motor, the combination of a support for the idler wheel, said support being movable to shift said idler wheel to a disengaged position out of driving relation with the turntable and pulley, an actuating mechanism for said switch including an arm pivotable between two extreme positions to open and close the switch, means urging said arm toward one extreme position whereby said switch is opened, latch means engageable with said arm to hold said arm in the second extreme position whereby said switch is closed, stop means adjusted by said arm, a control member for shifting said idler wheel support, said control member engaging said stop means to prevent shifting the idler wheel support when the stop element is adjusted corresponding to the position of the arm whereby the switch is closed, and means for releasing said latch means to enable movement of the arm toward the second extreme position whereby said switch is opened to break the circuit with the motor.

8. In a phonograph apparatus having a motor driven pulley, a turntable, and an idler wheel engageable with said pulley and said turntable, the combination of a support for the idler wheel, said support being movable to shift said idler wheel to a disengaged position out of driving relation with the turntable and the pulley, a control member for shifting said idler wheel support, a switch in circuit with the motor, an actuating mechanism for said switch including an arm pivotable between two positions to open and close the switch, means urging the arm toward one position whereby the switch is closed, latch means engageable with said arm to hold said arm in the other position whereby the switch is closed, and trip means between the control member and the latch means operable to free said arm upon movement of the control member to shift said idler pulley into the disengaged position, to enable said arm to seek the second position whereby the switch is opened and the circuit with the motor broken.

9. In a phonograph apparatus having a motor driven stepped driving pulley, a record turntable, and an idler wheel engageable with said stepped pulley and the periphery of said record turntable, the combination of a support for said idler wheel, said support being movable in a horizontal direction to shift the idler wheel out of driving relation with the stepped pulley and in a vertical direction to raise and lower the idler wheel from level to level for engagement with the different steps of said stepped pulley, resilient spring means connected to said support to urge the latter in a direction to engage the idler wheel with the stepped pulley and the periphery of the turntable, an arm mounted for horizontal movement into engagement with said support to move the latter in a direction opposed to the resilient spring means to separate the idler wheel from engagement with the stepped pulley and the periphery of the turntable, a manually adjustable control member rotatably mounted about a fixed axis for movement between positions corresponding to different turntable speeds provided by the different steps of the drive pulley, a first cam connection between said control member and said arm for moving the latter horizontally upon rotary movement of the control member to move said support horizontally and said idler wheel out of engagement with the stepped pulley and the turntable, a second cam connection coupling said control member to said support and arranged to move said support vertically, and said idler wheel between the levels of the various steps of the stepped pulley, the resilient spring means via the first cam connection and the control member being effective to yieldingly resist rotary movement of said control member so as to positively locate the idler wheel support at its various positions corresponding to the different turntable speeds.

10. In a phonograph apparatus having a motor driven stepped pulley, a turntable, an idler wheel engageable with said pulley and the periphery of said turntable, and a tone arm adjustable from a rest position to a position for playing a record carried on said turntable, the combination of a support for the idler wheel, said support being movable to shift the idler wheel laterally into and out of engagement with the stepped pulley and vertically from level to level for engagement with the different steps of said stepped pulley, resilient spring means connected to said support to urge the latter in a direction to engage the idler wheel with the stepped pulley and the periphery of the turntable, a manually adjustable control member mounted for movement between positions corresponding to different turntable speeds provided by the different steps of the drive pulley and a zero position, a first cam connection between said control member and said lever for moving the latter horizontally to engage and move said support laterally against the force of said resilient spring means to clear the idler wheel from each pulley step upon movement of the control member between positions, said first cam connection being arranged to move the support laterally to separate the idler wheel from the periphery of the turntable and the stepped pulley upon movement of the control member to the zero position, a second cam connection coupling said control member to said support and arranged to move said support vertically from level to level for engagement with the different steps of said stepped pulley, simultaneously with lateral movement thereof by said first cam connection, said resilient spring means via said first cam connection and control member being effective to yieldingly resist movement of said control member between its positions so as to positively locate the idler wheel at the different levels of the steps of the pulley; and means for holding the tone arm in rest position while the control member is in the zero position, including a latch member mounted for pivotal movement about a fixed axis and having one end arranged to fit over an edge of the tone arm to lock the latter, and means carried by the control member and coacting with the other end of the lever to pivot the lever into locking position upon movement of the control member to the zero position.

11. In a phonograph apparatus having a motor driven stepped pulley, a turntable, an idler wheel engageable with said pulley and the periphery of said turntable, and a tone arm movable from a rest position to a position for playing a record carried on said turntable, the combination of a support for the idler wheel, said support being movable (1) horizontally to shift said idler wheel into and out of engagement with said turntable and the stepped pulley, (2) vertically to shift the idler wheel between the different steps of said stepped pulley and (3) horizontally to shift the idler wheel into and from a fully disengaged zero position separated from contact with the turntable and the stepped pulley, spring means connected to the support for urging the latter in a direction to wedge the idler wheel in drive relation between the stepped pulley and the turntable, a control mechanism for moving the idler wheel to the zero as well as to the drive positions including a single actuating member mounted for movement manually from a zero position through successive drive positions corresponding to positions of the idler wheel, cam means activated by said actuating member and coupled to the idler wheel support, said cam means having effective portions for translating initial movement of the actuating member from a first toward a second position into horizontal movement of the support in a direction against said spring means to separate the idler wheel from drive relation, said spring means being effective to return the idler wheel into drive relation upon completion of the movement of the actuating member to the second position, and means actuable by said actuating member in conjunction with shifting said idler wheel into the zero position, for holding the tone arm in rest position to prevent said tone arm from being moved, said last-named means including a movable locking member arranged to fit over the tone arm to lock the latter upon movement of the member to a locking position, and means connected to the actuating member and coacting with the locking member to move the member into the locking position upon movement of the actuating member to the zero position.

12. In a change speed mechanism for a phonograph apparatus having a motor driven stepped driving pulley, a record turntable, and an idler wheel, the combination comprising, a floating mount for rotatably supporting the idler wheel, said mount being vertically and laterally movable between a zero position wherein the idler wheel is opposite the pulley and spaced from the same and the turntable, and drive positions wherein the idler wheel is in engagement with the drive pulley and the turntable, spring means connected to the mount for urging the idler wheel into drive relation between the pulley and the turntable, a manually operable controller for said mechanism having zero and drive positions, said controller including a rotary member mounted for movement about a fixed axis and having a vertically movable element connected to the idler wheel mount for raising and lowering the latter upon movement of the rotary member, an arm movable about a fixed axis into engagement with the idler wheel mount to shift the latter laterally in a direction opposed to the spring means to separate the idler wheel from drive relation with the pulley and the turntable, and a connection between said rotary member and said arm operative upon movement of the controller to the zero position to move the arm into engagement with the idler wheel mount to shift the idler wheel to the zero position, said spring means being effective to return the idler wheel into drive relation upon movement of the controller to a drive position.

13. In a phonograph apparatus having a motor driven stepped drive pulley, a record turntable, and an idler wheel, the combination comprising, a floating mount for rotatably supporting the idler wheel, means supporting said mount for vertical sliding movement on a fixed member and for lateral movement relative to said member to shift and idler wheel between adjacent pulley steps and toward and away from engagement with each of said pulley steps, spring means tending to urge the idler wheel mount laterally to engage the idler wheel in drive relation between the pulley and the turntable, a rotary actuating member having successive drive positions, first cam means operated by said actuating member and engaging said mount to produce lateral movement of the latter against said spring means upon initial movement of the rotary actuating member between said drive positions, second cam means coacting with said actuating member and engaging said mount to produce unstepped vertical sliding movement of the latter to change the position of the idler wheel from the plane of one pulley step to the plane of the adjacent pulley step upon completion of the movement of the actuating member to the other drive position, said spring means and first cam means thereafter operating to hold the rotary actuating member at said other drive position.

14. In a phonograph apparatus having a motor driven stepped drive pulley, a record turntable, and an idler wheel, the combination comprising, a floating mount for rotatably supporting the idler wheel, means supporting said mount for vertical sliding movement on a fixed member and for lateral movement relative to said member to shift said idler wheel between adjacent pulley steps and toward and away from engagement with each of said pulley steps, spring means tending to urge the idler wheel mount laterally to engage the idler wheel in drive relation between the pulley and the turntable, a rotary actuating member having successive drive positions, first cam means operated by said actuating member and engaging said mount to produce lateral movement of the latter against said spring means upon initial movement of the rotary actuating member between said drive positions, second cam means coacting with said actuating member and engaging said mount to produce unstepped vertical sliding movement of the latter to change the position of the idler wheel from the plane of one pulley step to the plane of the adjacent pulley step upon completion of the movement of the actuating member between said drive positions, said spring means and first cam means thereafter operating to hold said idler wheel mount against movement to fix said idler wheel at the plane of the adjacent pulley step.

15. In a phonograph apparatus having a motor driven pulley, a turntable, a tone arm movable from a fixed tone arm rest to a playing position over the turntable, a normally engaged friction drive mechanism between said pulley and said turntable, and a switch in circuit with the motor, the combination comprising, first means actuable to disengage said friction drive mechanism while said tone arm is on said rest, means for opening said switch and the circuit to the motor, latch means engageable with said tone arm to hold the latter on said rest, and means for operating said switch means and said latch means responsive to the actuation of said first means to disengage said friction drive mechanism.

References Cited in the file of this patent

UNITED STATES PATENTS

| | | |
|---|---|---|
| 2,525,926 | Matthews | Oct. 17, 1950 |
| 2,551,266 | Hartman | May 1, 1951 |
| 2,564,290 | Williamson | Aug. 14, 1951 |
| 2,599,963 | Williams | June 10, 1952 |
| 2,652,729 | Dale | Sept. 22, 1953 |
| 2,654,457 | Ammlung | Oct. 6, 1953 |

FOREIGN PATENTS

| | | |
|---|---|---|
| 504,207 | Belgium | July 14, 1951 |
| 504,296 | Belgium | July 14, 1951 |
| 483,437 | Italy | July 30, 1953 |
| 683,150 | Great Britain | Nov. 26, 1952 |
| 480,198 | Italy | Apr. 22, 1953 |